US010470435B2

(12) United States Patent
Fleming (10) Patent No.: US 10,470,435 B2
(45) Date of Patent: Nov. 12, 2019

(54) PIVOTAL AND SLIDABLE DOOR FOR A KENNEL

(71) Applicant: Becky H. Fleming, Round Hill, VA (US)

(72) Inventor: Becky H. Fleming, Round Hill, VA (US)

( * ) Notice: Subject to any disclaimer, the term of this patent is extended or adjusted under 35 U.S.C. 154(b) by 408 days.

(21) Appl. No.: 15/449,970

(22) Filed: Mar. 5, 2017

(65) Prior Publication Data

US 2018/0249675 A1 Sep. 6, 2018

(51) Int. Cl.
| | | |
|---|---|---|
| *A01K 1/03* | (2006.01) | |
| *A01K 1/02* | (2006.01) | |
| *A01K 1/035* | (2006.01) | |
| *E05D 13/00* | (2006.01) | |
| *E05D 15/48* | (2006.01) | |

(52) U.S. Cl.
CPC ............ *A01K 1/034* (2013.01); *A01K 1/0245* (2013.01); *A01K 1/035* (2013.01); *E05D 13/00* (2013.01); *E05D 15/48* (2013.01); *E05D 2015/485* (2013.01)

(58) Field of Classification Search
CPC ...... A01K 1/034; A01K 1/0245; A01K 1/035; A01K 1/0017; A01K 1/0035; A01K 1/0236; E05D 13/00; E05D 15/48; E05D 15/58; E05D 2015/485; E05D 2015/586
See application file for complete search history.

(56) References Cited

U.S. PATENT DOCUMENTS

| | | | | |
|---|---|---|---|---|
| 3,791,347 A | * | 2/1974 | Lovell | A01K 1/03 119/497 |
| 3,896,766 A | * | 7/1975 | Martin | A01K 1/03 119/474 |
| 4,546,728 A | | 10/1985 | May | |
| 4,763,606 A | * | 8/1988 | Ondrasik, II | A01K 31/08 119/474 |
| 4,852,212 A | | 8/1989 | Amann | |
| 5,233,939 A | * | 8/1993 | Randolph | A01K 1/0613 119/473 |
| 5,373,810 A | * | 12/1994 | Martin | A01K 31/10 119/459 |
| 5,626,098 A | * | 5/1997 | Askins | A01K 1/032 119/461 |
| 5,660,291 A | * | 8/1997 | Dash | B65D 7/26 220/6 |
| 5,678,509 A | | 10/1997 | Dillon | |
| 5,845,432 A | * | 12/1998 | Tully | A01M 23/20 43/61 |

(Continued)

FOREIGN PATENT DOCUMENTS

GB 599575 A * 3/1948 .......... E06B 3/5045

*Primary Examiner* — Joshua D Huson
(74) *Attorney, Agent, or Firm* — P. Jeff Martin; The Law Firm of P. Jeffrey Martin, LLC (57) ABSTRACT

A kennel door apparatus includes a pair of first bracket supports and a pair of second bracket support mounted to a kennel frame, an first and second guide rail mounted between the first and second support brackets, and an first door hinge and a second door hinge each separately coupled with the guide rails and bracket supports, and the hinges mounted to a door support that is mounted to a kennel door. The apparatus works cooperatively to slidably move the kennel door to a position adjacent the lateral wall of the kennel housing or frame.

16 Claims, 13 Drawing Sheets

(56) References Cited

U.S. PATENT DOCUMENTS

| | | | | |
|---|---|---|---|---|
| 6,092,488 A * | 7/2000 | Allawas | A01K 1/0245 119/474 |
| 6,192,834 B1 * | 2/2001 | Kolozsvari | A01K 31/08 119/498 |
| 8,408,416 B2 * | 4/2013 | Cheng-Lung | A01K 1/033 119/481 |
| 8,550,277 B2 | 10/2013 | Grönholm | |
| 8,613,260 B2 | 12/2013 | Veness et al. | |
| 8,925,492 B2 * | 1/2015 | Cantwell | A01K 1/0245 119/474 |
| 9,353,561 B2 * | 5/2016 | Gaenzle | E05D 11/1007 |
| 9,399,889 B2 * | 7/2016 | Cantwell | A01K 1/032 |
| 10,085,416 B2 * | 10/2018 | Link | A01K 1/034 |
| 2004/0134444 A1 * | 7/2004 | Shiever | A01K 1/0245 119/496 |
| 2005/0034679 A1 * | 2/2005 | Link | A01K 1/0245 119/474 |
| 2007/0000447 A1 * | 1/2007 | Jakubowski | A01K 1/034 119/453 |
| 2007/0227460 A1 * | 10/2007 | Lynch | A01K 1/0245 119/455 |
| 2008/0245313 A1 * | 10/2008 | Jakubowski | A01K 1/0245 119/497 |
| 2010/0282179 A1 * | 11/2010 | Ho | A01K 1/03 119/455 |
| 2012/0037083 A1 * | 2/2012 | Greene | A01K 1/0245 119/497 |
| 2012/0186529 A1 * | 7/2012 | Cantwell | A01K 1/0245 119/474 |
| 2012/0186530 A1 * | 7/2012 | Cantwell | A01K 1/0245 119/474 |
| 2014/0209036 A1 * | 7/2014 | Cantwell | A01K 1/032 119/481 |
| 2015/0067985 A1 * | 3/2015 | Gaenzle | E05D 3/022 16/319 |
| 2015/0300075 A1 * | 10/2015 | Lyons | E06B 3/509 312/311 |
| 2016/0135428 A1 | 5/2016 | Nicholson | |
| 2016/0192611 A1 * | 7/2016 | Cantwell | A01K 1/032 119/481 |
| 2017/0000080 A1 * | 1/2017 | Bin | A01K 1/03 |
| 2017/0055486 A1 * | 3/2017 | Bin | A01K 1/0245 |
| 2017/0055487 A1 * | 3/2017 | Bin | A01K 1/0245 |
| 2017/0055488 A1 * | 3/2017 | Bin | A01K 1/0245 |
| 2017/0055489 A1 * | 3/2017 | Bin | A01K 1/0245 |
| 2017/0156286 A1 * | 6/2017 | Cantwell | A01K 1/03 |
| 2017/0295748 A1 * | 10/2017 | He | A01K 1/034 |

* cited by examiner

PIVOTAL AND SLIDABLE DOOR FOR A KENNEL

I. RELATED APPLICATIONS

There are no previously filed, nor currently any co-pending applications, anywhere in the world.

II. FIELD OF THE INVENTION

This application discloses claims and embodiments generally related to kennel openings, and more particularly, to a kennel in the form of a lightweight and portable kennel door.

III. BACKGROUND OF THE INVENTION

Numerous attempts have been made to improve pet kennel apparatuses, including changing the dimensions and locations of the door to accommodate small areas in which a pet and its kennel may need to reside for a period of time each day.

Accordingly, a need exists for an improved kennel with a door-sliding apparatus.

A search of the prior art did not disclose any patents that read directly on the claims of the instant invention; however, the following references were considered related:

U.S. Pat. No. 8,550,277 B2, issued in the name of Grönholm;

U.S. Pat. No. 4,852,212, issued in the name of Amann;

U.S. Pat. No. 4,546,728, issued in the name of May;

U.S. Pat. No. 5,678,509, issued in the name of Dillon;

U.S. Patent Application no. 2016/0135428 A1, published in the name of Nicholson;

U.S. Pat. No. 4,763,606, issued in the name of Ondrasik, II; and

U.S. Pat. No. 8,613,260 B2, issued in the name of Veness et al.

This application presents claims and embodiments that fulfill a need or needs not yet satisfied by existing products, inventions and methods previously or presently available or disclosed. In particular, the claims and embodiments disclosed herein describe a kennel door apparatus, the apparatus comprises a pair of first support brackets mounted to a kennel frame; an first door hinge comprising an first door hinge bore aligned with each one of the first support bracket bores; an first guide rail intermediately disposed between the pair of first support bracket bores and disposed through the first door hinge bore; a pair of second support brackets mounted to a kennel frame, wherein each one of the second support brackets comprises a second support bracket bore; a second door hinge comprising a second door hinge bore aligned with the second support bracket bores; a second guide rail intermediately disposed between the pair of second support bracket bores and disposed through the second door hinge bore; and a door support coupled with the first door hinge and the second door hinge, the kennel door apparatus providing unanticipated and nonobvious combination of features distinguished from the products, inventions and methods preexisting in the art. The applicant is unaware of any product, device, method, disclosure or reference that discloses the features of the claims and embodiments disclosed herein, and as more fully described below.

IV. SUMMARY OF THE INVENTION

In one embodiment, a kennel door apparatus comprising a pair of first support brackets mounted to a kennel frame, wherein each one of the first support brackets comprises a first support bracket bore; a first door hinge comprising a first door hinge bore aligned with each one of the first support bracket bores; a first guide rail intermediately disposed between the pair of first support bracket bores and disposed through the first door hinge bore; a pair of second support brackets mounted to a kennel frame, wherein each one of the second support brackets comprises a second support bracket bore; a second door hinge comprising a second door hinge bore aligned with the second support bracket bores; a second guide rail intermediately disposed between the pair of second support bracket bores and disposed through the second door hinge bore; and a door support coupled with the first door hinge and the second door hinge, the door support coupled to a kennel door.

The apparatus may further comprise a pair of first clamping plates and a pair of second clamping plates, wherein the pair of first clamping plates couple with the pair of first support brackets and the pair of second clamping plates couple with the pair of second support brackets.

The apparatus may further comprise a center support intermediately disposed between the first door hinge and the second door hinge. The center support may further comprise a magnetic element.

Each one of the first door hinge and the second door hinge comprises an aperture alignable to the door support for securing the first door hinge and the second door hinge to the door support. The door support further comprises a pair of hinge-points, each hinge-point having a recess for receiving the first door hinge and the second door hinge, each hinge-point having a through-bore aligned on both sides of the first door hinge and the second door hinge for insertion of a mechanical fastener therethrough.

The door support may further comprise a hinge-surface opposing a door-surface; a plurality of cut-outs disposed between the hinge-surface and the door-surface; and a magnetic element disposed between the cut-outs and between the hinge-surface and the door-surface. The door may further include a handle.

In another embodiment, a pet kennel comprises first lateral wall and a second lateral wall, the first lateral wall and the second lateral wall in mutual opposition; a top wall and a bottom wall, the top wall and the bottom wall in mutual opposition; a rear wall and a door, the rear wall and the door in mutual opposition, wherein the door further comprises: a pair of first support brackets mounted to one of the lateral walls, wherein each one of the first support brackets comprises an first support bracket bore; an first door hinge comprising an first door hinge bore aligned with each one of the first support bracket bores; an first guide rail intermediately disposed between the pair of first support bracket bores and disposed through the first door hinge bore; a pair of second support brackets mounted to the lateral wall that the pair of first support brackets are mounted, wherein each one of the second support brackets comprises a second support bracket bore; a second door hinge comprising a second door hinge bore aligned with the second support bracket bores; a second guide rail intermediately disposed between the pair of second support bracket bores and disposed through the second door hinge bore; and a door support coupled with the first door hinge and the second door hinge, the door support coupled to the door.

The apparatus may further comprise a pair of first clamping plates and a pair of second clamping plates, wherein the pair of first clamping plates couple with the pair of first support brackets and the pair of second clamping plates couple with the pair of second support brackets.

The apparatus may further comprise a center support intermediately disposed between the first door hinge and the second door hinge. The center support may further comprise a magnetic element.

Each one of the first door hinge and the second door hinge comprises an aperture alignable to the door support for securing the first door hinge and the second door hinge to the door support. The door support further comprises a pair of hinge-points, each hinge-point having a recess for receiving the first door hinge and the second door hinge, each hinge-point having a through-bore aligned on both sides of the first door hinge and the second door hinge for insertion of a mechanical fastener therethrough.

The door support may further comprise a hinge-surface opposing a door-surface; a plurality of cut-outs disposed between the hinge-surface and the door-surface; and a magnetic element disposed between the cut-outs and between the hinge-surface and the door-surface. The door as part of a kennel apparatus may further include a handle.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

VI. DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments of pet article, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Referring now to FIGS. 1-4E, wherein the distinction between FIGS. 4A-4B and 4C-4E is the orientation of the door for sliding along a lateral wall (FIGS. 4A, 4B) or along a top or upper wall (FIGS. 4c-4E), and wherein at least one embodiment of a kennel door apparatus 100 is depicted in accordance with the illustrations. As more particularly depicted in FIG. 4A and FIG. 6, the apparatus 100 comprises a pair of first support brackets 102, 104 mounted to a kennel (K) and the kennel frame, wherein each one of the first support brackets 102, 104 comprises an first support bracket bore 103, respectively. The apparatus 100 includes an first door hinge 110 comprising an first door hinge bore 111 aligned with each one of the first support bracket bores 103. The apparatus 100 includes an first guide rail 112 intermediately disposed between the pair of first support bracket bores 103 and disposed through the first door hinge bore 111.

Figure 1:
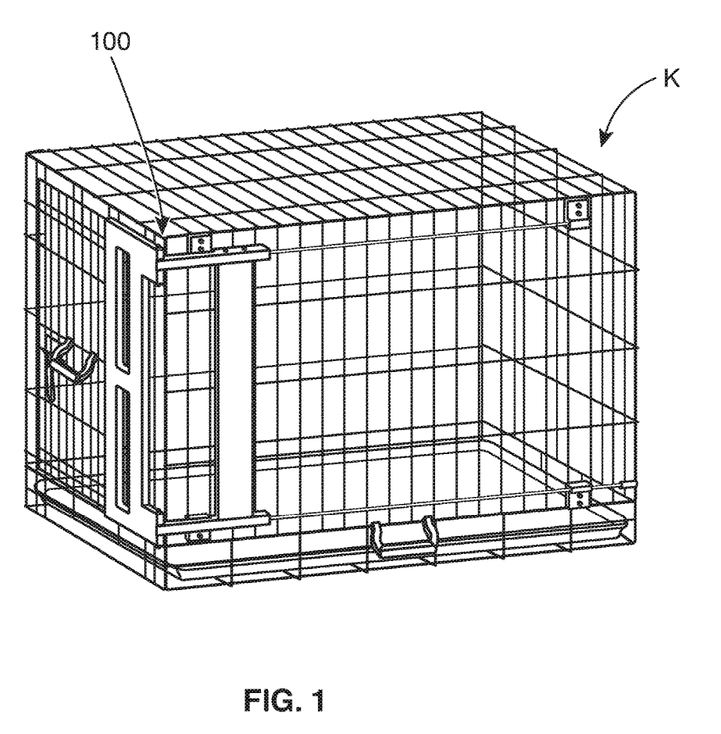
FIG. 1 is a perspective view of a pet kennel having a kennel door apparatus mounted thereto, in accordance to one embodiment of the present invention.
Figure 2:
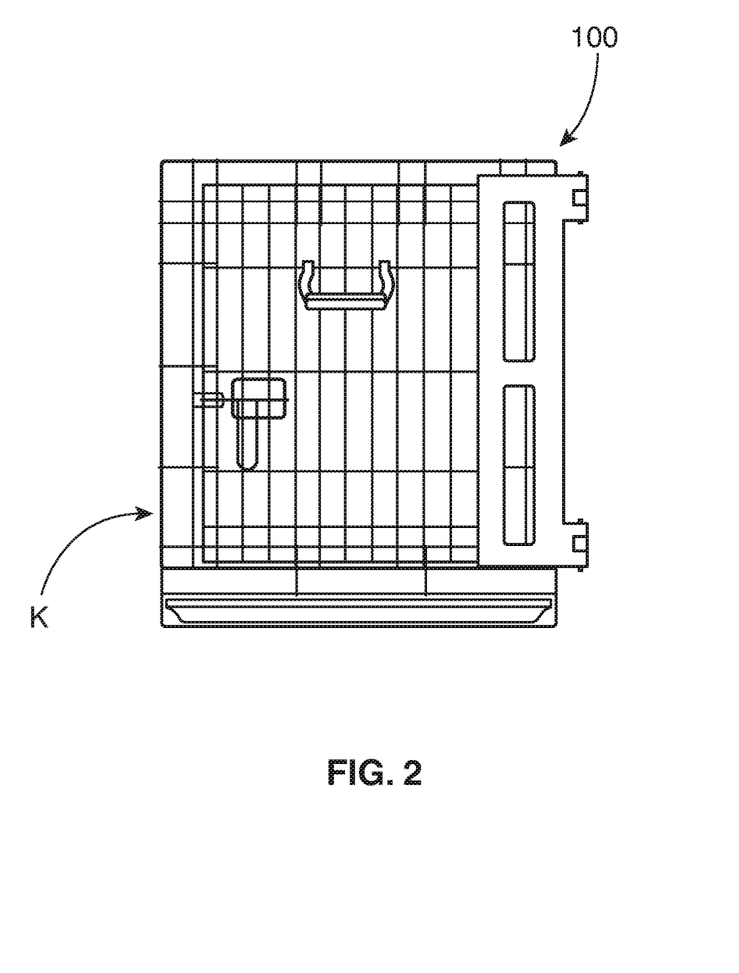
FIG. 2 is a front view of FIG. 1.
Figure 3:
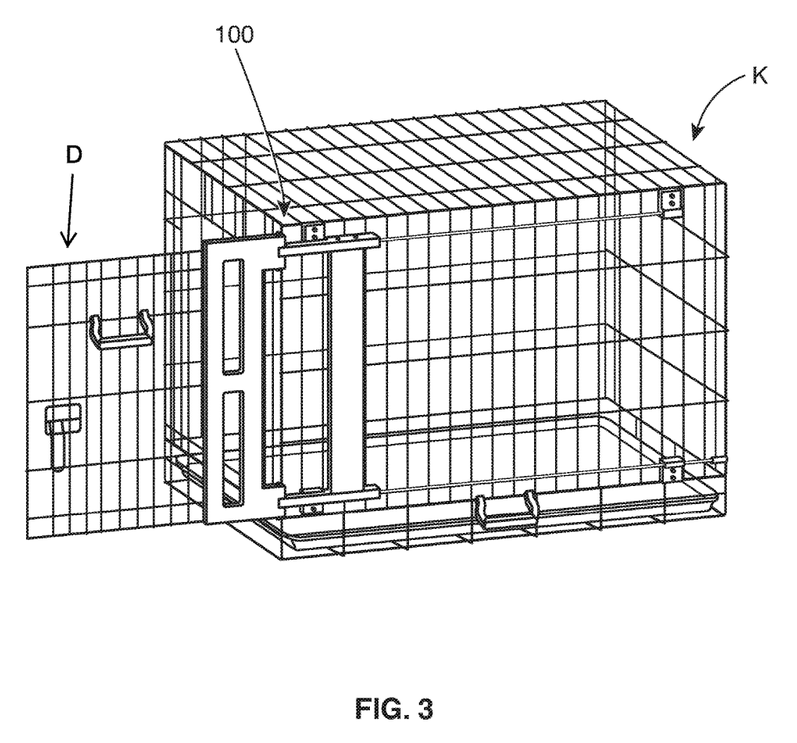
FIG. 3 is a top view of FIG. 1.
Figure 4A:
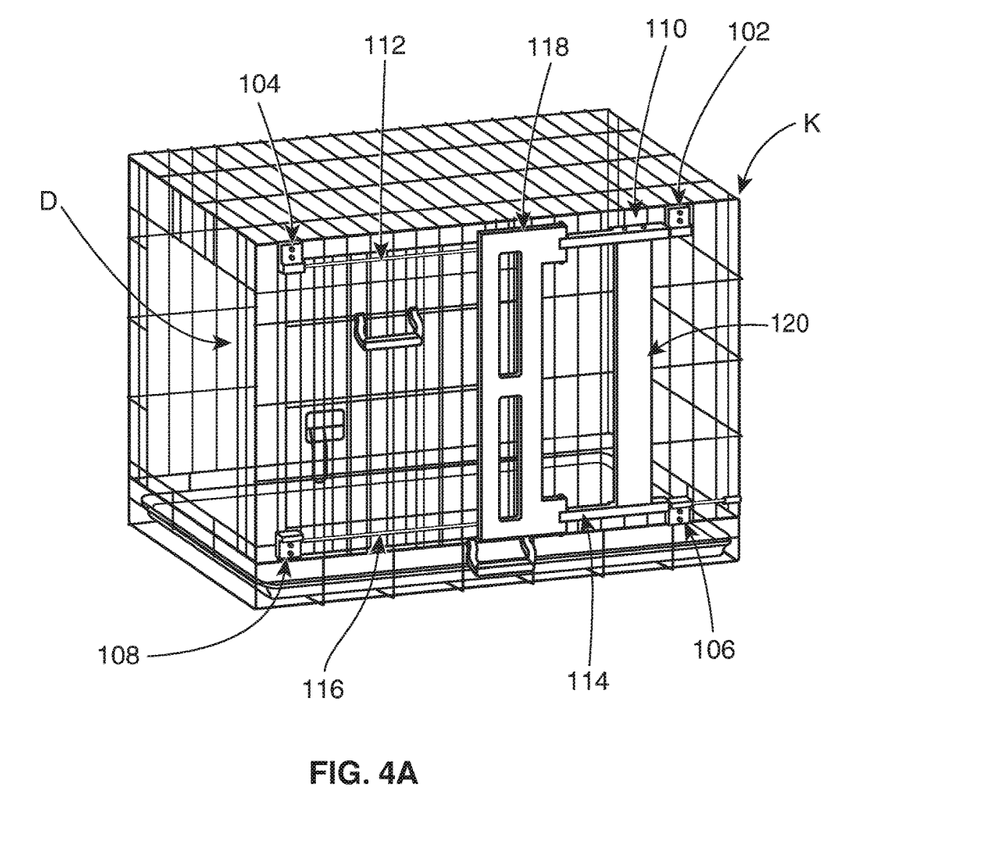
FIG. 4A is a front view of FIG. 1 with the kennel door apparatus slid-open.
Figure 4B:
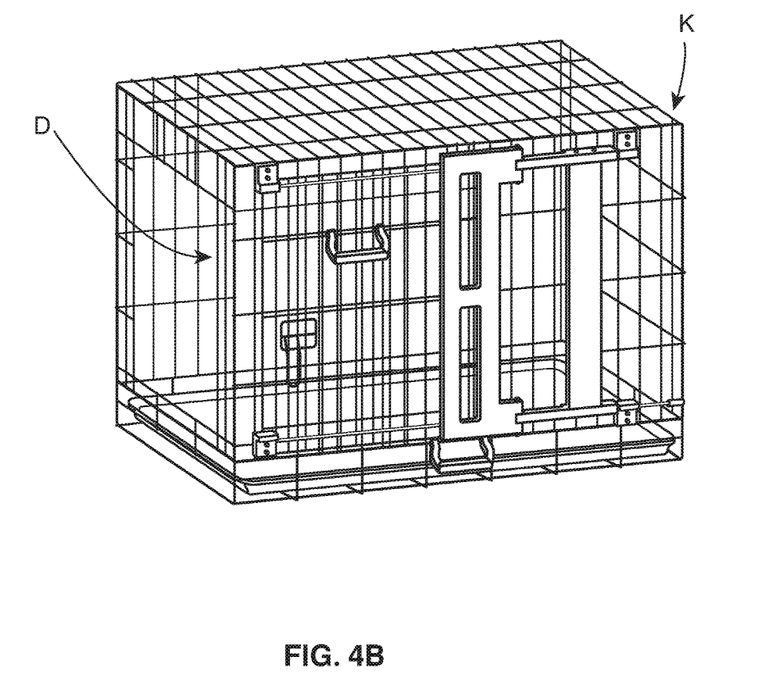
FIG. 4B is a side view of FIG. 4A.
Figure 4C:
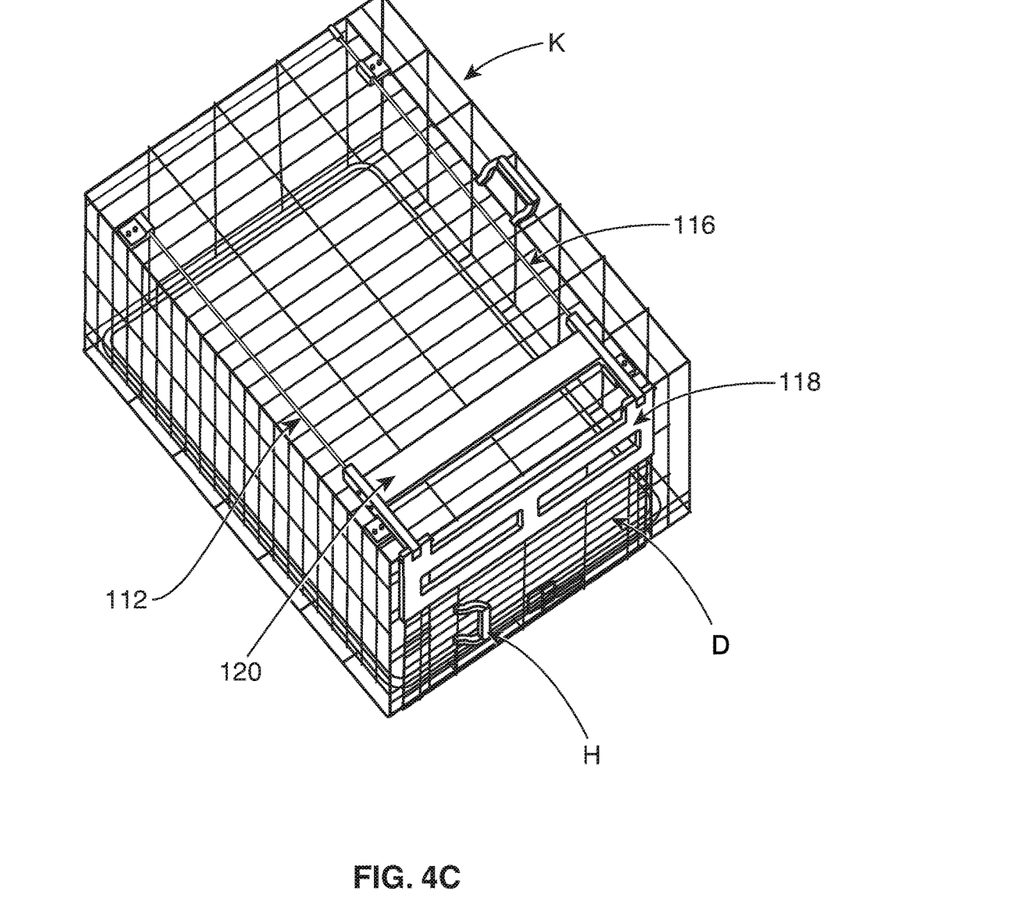
FIG. 4C through FIG. 4E are various views of a kennel with kennel door arranged for front or rear opening for movement along a top or upper wall or surface.
Figure 4D:
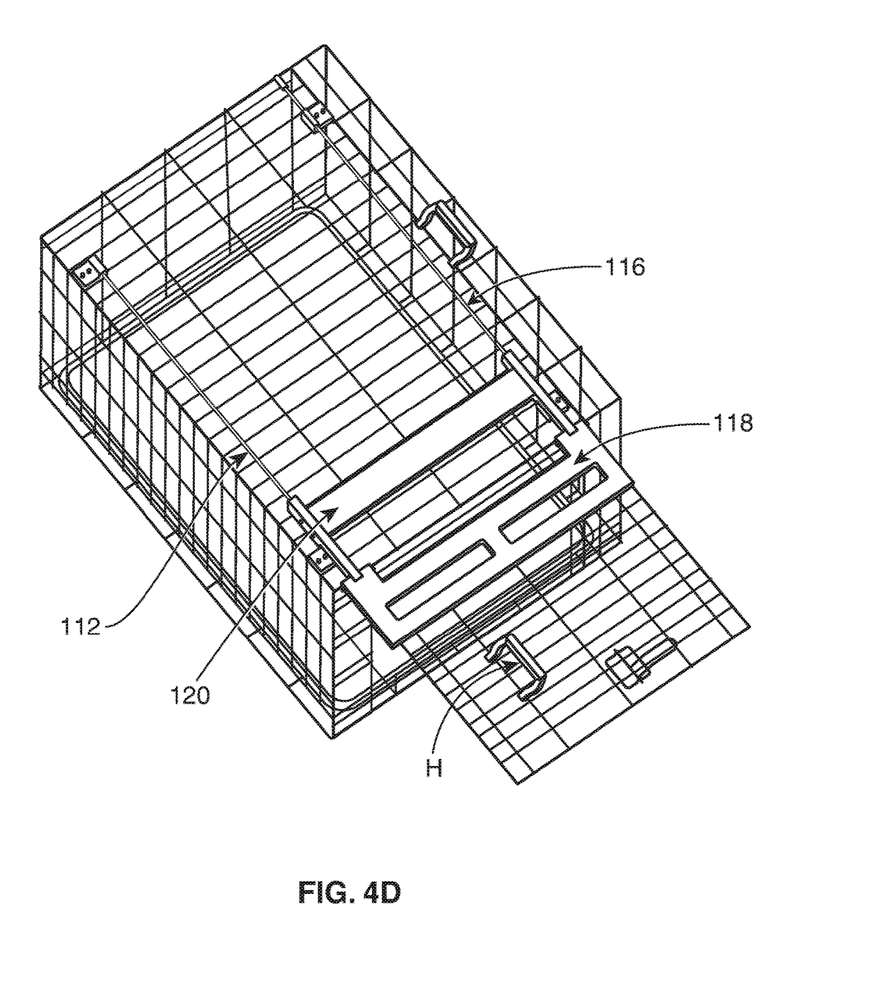
Figure 4E:
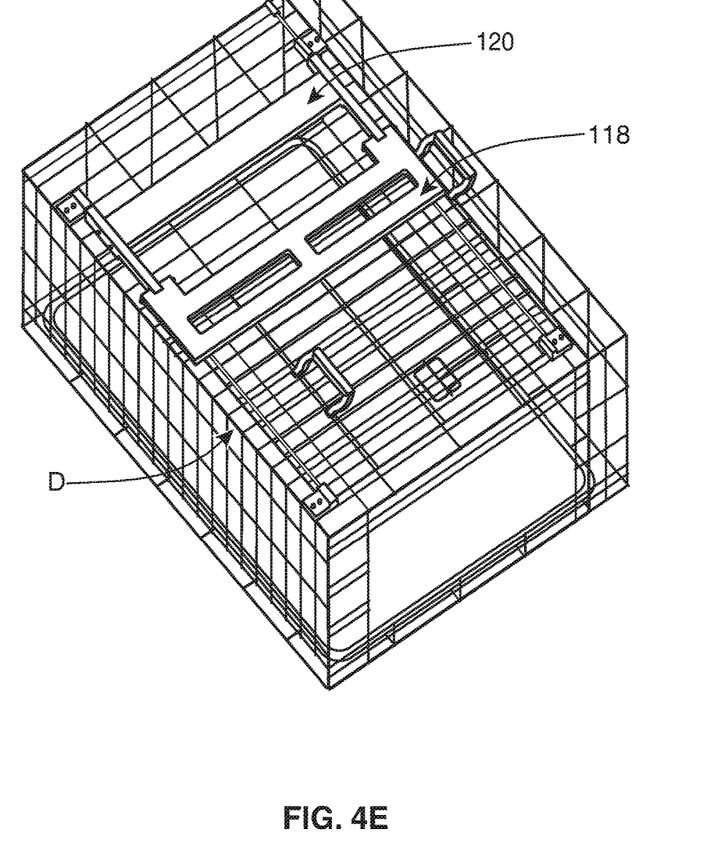

Similarly, a pair of second support brackets 106, 108 is mounted to the kennel (K) and the kennel frame, wherein each one of the second support brackets 106, 108 comprises a second support bracket bore 107. A second door hinge 114 comprises a second door hinge bore 115 aligned with the second support bracket bores 107. The apparatus 100 includes a second guide rail 116 intermediately disposed between the pair of second support bracket bores 107 and disposed through the second door hinge bore 115.

The apparatus 100 also includes a door support 118 coupled with the first door hinge 110 and the second door hinge 114, the door support 118 coupled to a kennel door (D). The door support 118 may also include a center support 120 intermediately disposed between the first door hinge 110 and the second door hinge 114. As depicted through the embodiments, a handle "H" may be included for assisting in moving or sliding the door D as appropriate. It is further envisioned that a locking mechanism may be included near or along the perimeter of the door as needed or desired.

Figure 5:
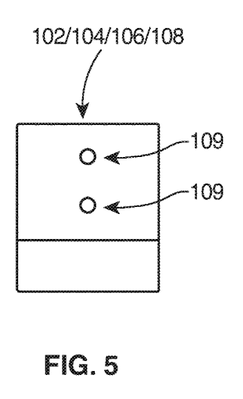
FIG. 5 is a front view of a bracket support.
Figure 6:
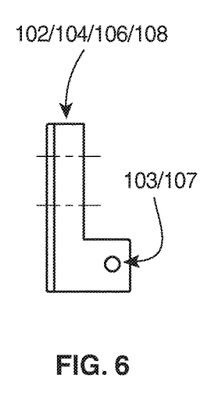
FIG. 6 is a side view of FIG. 5.
Figure 7:
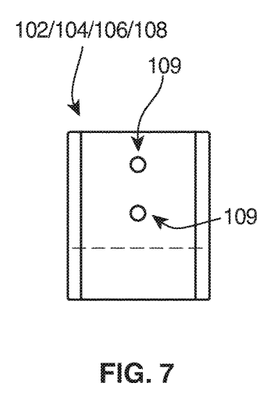
FIG. 7 is a rear view of FIG. 5.
Figure 8:
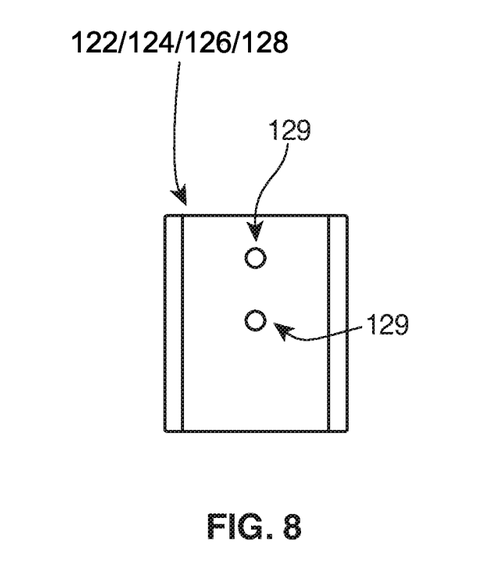
FIG. 8 is a front view of a clamping plate.
Figure 9:
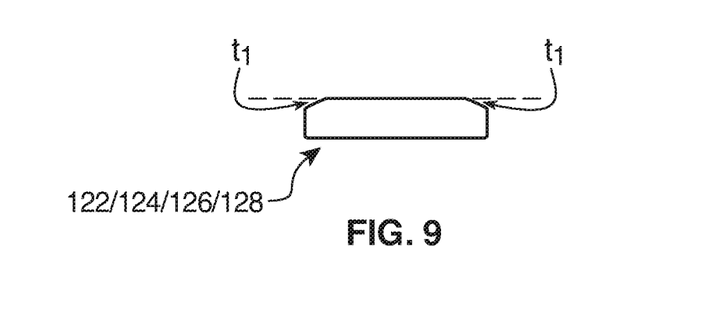
FIG. 9 is a bottom view of FIG. 8.

As depicted in FIGS. 5 through 7, the first bracket supports 102, 104 and the second bracket supports 106, 108 may be generally represented by one illustration, with the understanding that first bracket supports 102, 104 are mirror images of one another with the bores 103 aligned facing one-another, and similarly that second bracket supports 106, 108 are mirror images of one another with the bores 107 aligned facing one-another. Thus, for illustrations purposes, the bracket support depicted in FIGS. 5 through 7 represent each of the bracket supports 102, 104, 106, 108 depicted in the figures, and that the bore represents reference characters 103 and 107 relative to the bracket supports 102, 104 (bore 103) and bracket supports 106, 108 (bore 107), respectively.

As depicted in FIG. 6, the bracket supports 102, 104, 106, 108 have an L-shaped profile, with the horizontal block extending away from the vertical block and providing an off-set from an imaginary axis drawn through the vertical block. The bore 103 or 107 is formed in the horizontal block extending away from the vertical block. The guide rail 112 and/or 116 are intermediately disposed between aligned bracket supports 102, 104 and/or 106, 108, whereby the guide rail 112 is inserted into and housed by bores 103 of first bracket supports 102, 104 and guide rail 116 is inserted into and housed by bores 107 of second bracket supports 106, 108, respectively. As will be discussed below, guide rail 112 supports first door hinge 110 (by insertion through bore 111) and guide rail 116 supports second door hinge 114 (by insertion through bore 115). The guide rails 112 and 116 may be further characterized as first guide rail 112 and second guide rail 116.

As depicted in FIGS. 5 through 9, bracket supports 102, 104, 106, 108 may be coupled to the kennel (K) and the kennel frame by first clamping plates 122, 124 (coupled to bracket supports 102, 104) and second clamping plates 126, 128 (coupled to bracket supports 106, 108), respectively. The first clamping plates 122, 124 and second clamping plates 126, 128 may be represented by one illustration, as generally provided in FIGS. 8 and 9. In one embodiment, each bracket support 102, 104, 106, 108 and each clamping plate 122, 124, 126, 128 may each have one or more apertures 109 (for bracket supports) and 129 (for clamping plates), wherein the apertures 109 of the bracket supports align with the apertures 129 of the clamping plates and allow for insertion of a threaded fastener, a rivet, or other similarly suitable mechanical coupling device. As further depicted in FIG. 9, the clamping plates 122, 124, 126, 128 may also include a longitudinal perimeter with a taper (t1) (envisioned to be in the range of 1-30 degrees, and more preferably approximately 18 degrees, as measured from an imaginary plane extending from the front surface of the clamping plates).

Figure 10:
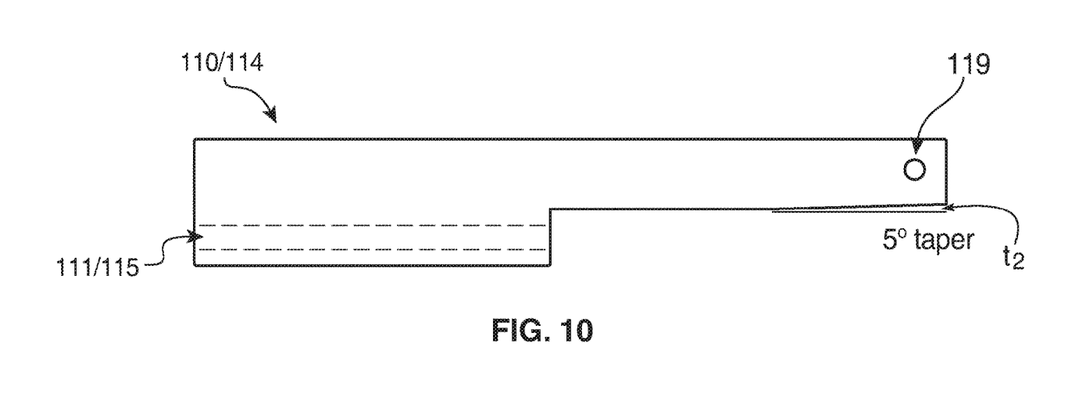
FIG. 10 is a top view of a door hinge support.
Figure 11:
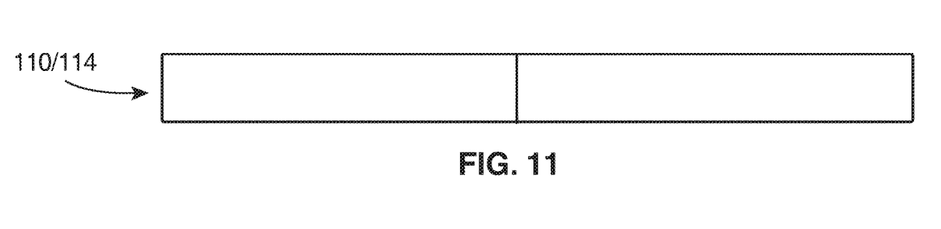
FIG. 11 is a side view of FIG. 10.
Figure 12:
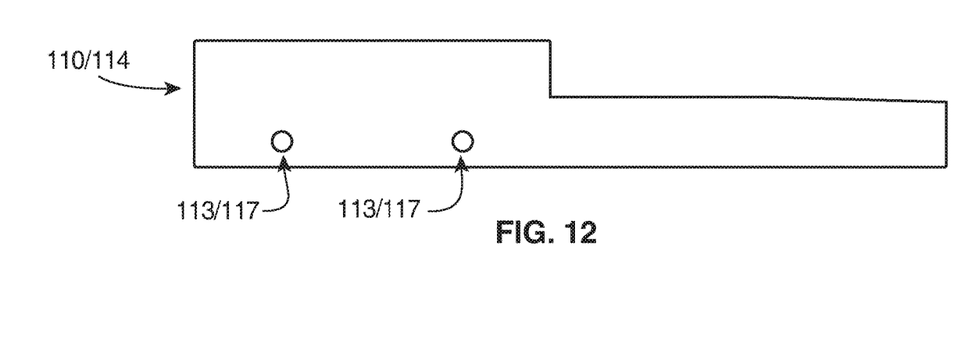
FIG. 12 is a bottom view of FIG. 10.

As depicted in FIGS. 10 through 12, the first door hinge 110 and the second door hinge 114 are generally represented by the illustrations therein. Each door hinge 110, 114 has an approximate b-shaped or p-shaped profile, wherein the larger or rounded portion of the hinge 110, 114 comprises a bore 111 or 115 formed through the hinge 110, 114, and wherein the larger or round portion of the hinge 110, 114 comprises a plurality of apertures 113 or 117 for receiving threaded fasteners, rivets, or other similarly suitable mechanical couplers for securing the center support 120 between the first door hinge 110 and the second door hinge 114 (and discussed in greater detail below). Each hinge 110, 114 also includes an aperture 119 for securing the hinges 110, 114 to the door support 118 (also discussed in greater detail below). Adjacent the aperture 119, the stem-portion of the hinge 110, 114 includes a slight-taper (t2) (in a range of 1-15 degrees, but more preferably approximately 5 degrees) to allow the hinge 110, 114 flexibility as it slides between closed and opened positions.

Figure 13:
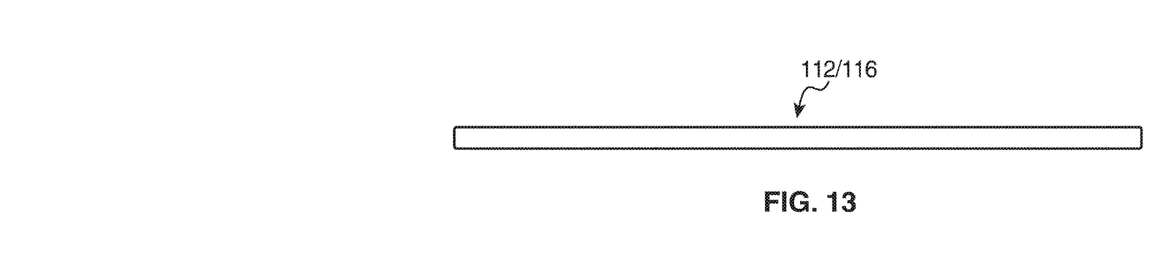
FIG. 13 is a side view of a guide rail.

As depicted in FIG. 13, the first guide rail 112 and the second guide rail 116 may be represented by the illustration. Each guide rail 112, 116 may be a linearly elongated body. It is envisioned that the body may be formed of a variety of materials, including metal (such as steel, iron, or aluminum), plastic(s), polymers, wood, or other material suitable for such use. As noted above, the guide rails 112, 116 are set within the bores 103, 107 of the first bracket supports 102, 104 and the second bracket supports 106, 108, respectively. In assembly of the apparatus 100, before the guide rails 112, 116 are finally placed within the bores 103, 107, the door hinges 110, 114 must be inserted onto the guide rails 112, 116 via the through-bores 111, 115 of the first door hinge 110 and the second door hinge 114, respectively. Through this arrangement, the door hinges 110, 114 may slide along the guide rails 112, 116 via the through-bores 111, 115 and allow the apparatus 100 to slide or move between a completely closed position, to an intermediate position, and then to a completely opened position, as generally represented in FIGS. 1-4B.

Figure 14:
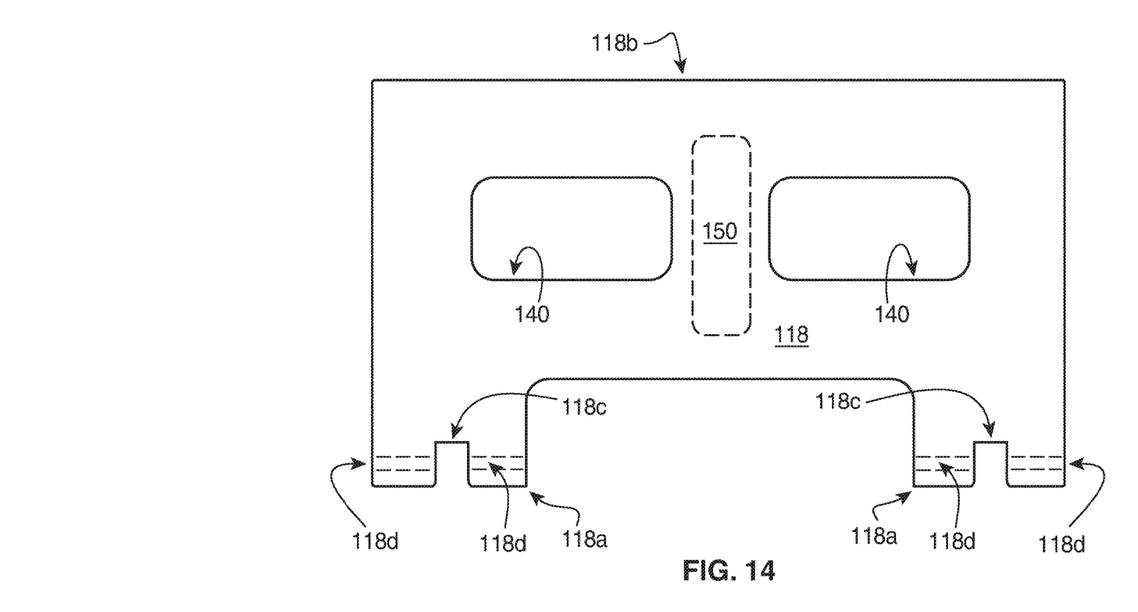
FIG. 14 is a front view of a door support.

As generally depicted in FIG. 14, a door support 118 is shown having a hinge-surface 118a and a door-surface 118b. The door support 118 is approximately the same height as the kennel door (D), wherein the hinge-surface 118a may be coupled to the door hinges 110, 114 by mechanical coupler(s) (e.g., threaded fasteners, rivets, mechanical fasteners/devices), and wherein the door-surface 118b may be coupled to the kennel door (D).

The hinge-surface 118a may have a variety of arrangements and configurations. One embodiment envisioned includes a pair of hinge-points that each comprise a recess 118c formed therein for receiving the door hinges 110, 114 along the apertures 119 providing therein. Each hinge-point includes a through-bore 118d that aligns with aperture(s) 119 and allows a mechanical fastener to be inserted therethrough (aperture 119 and through-bore 118d) to firmly secure the door hinge(s) 110, 114 to the door support 118.

The door-surface 118b may have a variety of arrangements and configurations. One embodiment envisioned includes means for attaching or securing the kennel door (D) to the door-surface 118b of the door support 118. A number of means may be used, including a channel for friction-fit impingement, mechanical fasteners, or other suitable means. The door support 118 may also include one or more cut-outs 140 that allows a person to grasp the door support 118 and slidably move the door support 118 and associated elements to an opened, closed, or intermediate position.

Figure 15:
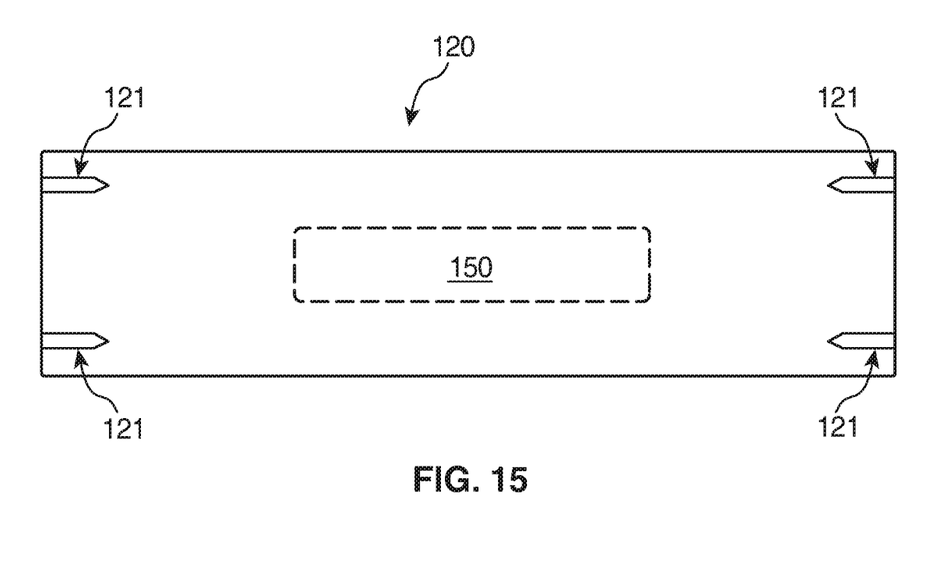
FIG. 15 is a front view of a center support.

As depicted in FIG. 15, a center support 120 may be intermediately disposed between the first door hinge 110 and the second door hinge 114. The center support 120 may be linearly elongated and may include a plurality of apertures or recesses 121 for receiving mechanical fasteners (including threaded bolts or screws, and/or rivets) for securing the center support 120 to the hinges 110, 114 through or utilizing apertures 113 and/or 117 formed in the hinges 110, 114.

It is further envisioned that a magnetic element 150 may be included to further secure the kennel door (D) in an opened position along the longitudinal side-wall of the kennel and the kennel frame. For example, the magnetic element 150 may be a bar-shape or elongated-shape integral to and/or formed separately and attached to one of several separately elements, such as the door support 118 (of FIG. 14) and/or the center support 120 (of FIG. 15). It is also envisioned that one or more magnetic elements may be included or attached to the first and second door hinges 110, 114 separately or in combination with the supports 118 and/or 120 referenced above. The magnetic element 150 will be used in combination with an opposite polarity magnetic element either separately attached or if the kennel and/or kennel frame is made from the appropriate material then utilizing the natural attractive force(s) of the kennel/kennel frame material in conjunction with the magnetic element.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions. Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A kennel door apparatus comprising:
   a pair of first support brackets mounted to a kennel frame, wherein each one of the first support brackets comprises a first support bracket bore;
   a first door hinge comprising a first door hinge bore aligned with each one of the first support bracket bores;
   a first guide rail intermediately disposed between the pair of first support bracket bores and disposed through the first door hinge bore;
   a pair of second support brackets mounted to a kennel frame, wherein each one of the second support brackets comprises a second support bracket bore;
   a second door hinge comprising a second door hinge bore aligned with the second support bracket bores;
   a second guide rail intermediately disposed between the pair of second support bracket bores and disposed through the second door hinge bore; and
   a door support coupled with the first door hinge and the second door hinge, the door support coupled to a kennel door, wherein the door support comprises:
      a hinge-surface opposing a door-surface;
      a plurality of cut-outs disposed between the hinge-surface and the door-surface; and
      a magnetic element disposed between the cut-outs and between the hinge-surface and the door-surface.

2. The apparatus of claim 1, wherein the door-surface comprises means for coupling with the kennel door.

3. The apparatus of claim 1, further comprising a pair of first clamping plates and a pair of second clamping plates, wherein the pair of first clamping plates couple with the pair of first support brackets and the pair of second clamping plates couple with the pair of second support brackets.

4. The apparatus of claim 1, further comprising a center support intermediately disposed between the first door hinge and the second door hinge.

5. The apparatus of claim 4, wherein the center support further comprises a magnetic element.

6. The apparatus of claim 1, wherein each one of the first door hinge and the second door hinge comprises an aperture alignable to the door support for securing the first door hinge and the second door hinge to the door support.

7. The apparatus of claim 6, wherein the door support further comprises a pair of hinge-points, each hinge-point having a recess for receiving the first door hinge and the second door hinge, each hinge-point having a through-bore aligned on both sides of the first door hinge and the second door hinge for insertion of a mechanical fastener therethrough.

8. The apparatus of claim 1 further comprising a handle.

9. A pet kennel comprising:
   a first lateral wall and a second lateral wall, the first lateral wall and the second lateral wall in mutual opposition;
   a top wall and a bottom wall, the top wall and the bottom wall in mutual opposition;
   a rear wall and a front wall, the rear wall and the front wall in mutual opposition; and
   a door, wherein the door comprises:
      a pair of first support brackets mounted to one of the walls, wherein each one of the first support brackets comprises a first support bracket bore;
      a first door hinge comprising a first door hinge bore aligned with each one of the first support bracket bores;
      a first guide rail intermediately disposed between the pair of first support bracket bores and disposed through the first door hinge bore;
      a pair of second support brackets mounted to the wall that the pair of first support brackets are mounted, wherein each one of the second support brackets comprises a second support bracket bore;
      a second door hinge comprising a second door hinge bore aligned with the second support bracket bores;
      a second guide rail intermediately disposed between the pair of second support bracket bores and disposed through the second door hinge bore; and
      a door support coupled with the first door hinge and the second door hinge, the door support coupled to the door, and wherein the door support comprising:
         a hinge-surface opposing a door-surface;
         a plurality of cut-outs disposed between the hinge-surface and the door-surface; and
         a magnetic element disposed between the cut-outs and between the hinge-surface and the door-surface.

10. The pet kennel of claim 9 further comprising a pair of first clamping plates and a pair of second clamping plates, wherein the pair of first clamping plates couple with the pair of first support brackets and the pair of second clamping plates couple with the pair of second support brackets.

11. The pet kennel of claim 9, further comprising a center support intermediately disposed between the first door hinge and the second door hinge.

12. The pet kennel of claim 11, wherein the center support further comprises a magnetic element.

13. The pet kennel of claim 9, wherein each one of the first door hinge and the second door hinge comprises an aperture alignable to the door support for securing the first door hinge and the second door hinge to the door support.

14. The pet kennel of claim 13, wherein the door support further comprises a pair of hinge-points, each hinge-point having a recess for receiving the first door hinge and the second door hinge, each hinge-point having a through-bore aligned on both sides of the first door hinge and the second door hinge for insertion of a mechanical fastener therethrough.

15. The pet kennel of claim 9, wherein the door-surface comprises means for coupling with the door.

16. The pet kennel of claim 9 further comprising a handle.

* * * * *